United States Patent
Manasseh

(10) Patent No.: US 9,611,054 B2
(45) Date of Patent: Apr. 4, 2017

(54) LAUNCHING AN UNMANNED AERIAL VEHICLE USING A HAND-HELD WEAPON

(71) Applicant: AAI Corporation, Hunt Valley, MD (US)

(72) Inventor: Alexander D. Manasseh, Cockeysville, MD (US)

(73) Assignee: AAI Corporation, Hunt Valley, MD (US)

( * ) Notice: Subject to any disclaimer, the term of this patent is extended or adjusted under 35 U.S.C. 154(b) by 372 days.

(21) Appl. No.: 14/187,846

(22) Filed: Feb. 24, 2014

(65) Prior Publication Data

US 2016/0009412 A1  Jan. 14, 2016

(51) Int. Cl.
  *B64F 1/04* (2006.01)
  *B64C 39/02* (2006.01)

(52) U.S. Cl.
  CPC .............. *B64F 1/04* (2013.01); *B64C 39/024* (2013.01); *B64C 2201/08* (2013.01); *B64C 2201/203* (2013.01)

(58) Field of Classification Search
  None
  See application file for complete search history.

(56) References Cited

U.S. PATENT DOCUMENTS

| | | | |
|---|---|---|---|
| 4,614,318 A * | 9/1986 | Gobel | F42B 12/62 102/489 |
| 6,119,976 A * | 9/2000 | Rogers | B64C 39/024 244/13 |
| 6,523,478 B1 | 2/2003 | Gonzalez et al. | |
| 6,688,032 B1 | 2/2004 | Gonzalez et al. | |
| 7,410,124 B2 * | 8/2008 | Miller | B64C 39/024 124/65 |
| 7,437,985 B2 | 10/2008 | Gal | |
| 7,661,349 B1 * | 2/2010 | Brittingham | F41A 21/30 181/223 |
| 7,849,628 B2 * | 12/2010 | Condon | F41C 27/06 42/105 |
| 7,966,763 B1 | 6/2011 | Schneider et al. | |
| 8,020,769 B2 | 9/2011 | Papale et al. | |
| 8,115,149 B1 * | 2/2012 | Manole | F42B 10/18 102/430 |
| 8,209,897 B2 | 7/2012 | Schneider et al. | |
| 8,297,172 B2 | 10/2012 | Nelson et al. | |
| 8,584,985 B2 * | 11/2013 | Woolley | F41B 3/02 244/49 |

(Continued)

FOREIGN PATENT DOCUMENTS

CN          101249891 A1 *  8/2008

*Primary Examiner* — Medhat Badawi
*Assistant Examiner* — Vicente Rodriguez
(74) *Attorney, Agent, or Firm* — BainwoodHuang

(57) ABSTRACT

A technique is directed to launching an unmanned aerial vehicle (UAV). The technique involves attaching a UAV launcher to a hand-held weapon, and installing a UAV onto the UAV launcher while the UAV launcher is attached to the hand-held weapon. The technique further involves activating the hand-held weapon to launch the UAV into flight from the UAV launcher. Since a user already may be carrying the hand-held weapon for firing ammunition, the user simply needs to further carry the UAV launcher and the UAV which, in some situations, can be packaged into an easy-to-carry container such as a backpack, a carrying case, and so on.

21 Claims, 4 Drawing Sheets

(56) References Cited

U.S. PATENT DOCUMENTS

| | | |
|---|---|---|
| 8,857,312 B2 | 10/2014 | Nelson et al. |
| 9,080,832 B2 | 7/2015 | Brahler, II et al. |
| 2015/0142210 A1* | 5/2015 | Warsop ................ F42B 12/365 |
| | | 701/2 |

* cited by examiner

LAUNCHING AN UNMANNED AERIAL VEHICLE USING A HAND-HELD WEAPON

BACKGROUND

An unmanned aerial vehicle (UAV) is an aircraft which flies without a pilot on board. Rather, the UAV operates in accordance with a preprogrammed flight plan, in accordance with direction from a ground control station (GCS), or in accordance with both.

One conventional approach to launching a UAV is for a human to hand throw the UAV into the air. In this approach, the UAV is relatively small and the human typically stands up and throws the UAV horizontally or in a slightly upward direction to supply the UAV with initial height, lift and speed.

Another conventional approach to launching a UAV is for a team of humans to park a trailer-sized or desk-sized UAV launcher so that the UAV launcher aims into the wind. In this approach, the UAV is relatively large and heavy. The team of humans mounts the UAV onto the UAV launcher, and launches the UAV up and into the wind. Here, the UAV receives initial launch speed from the operation of pneumatics, hydraulics, and/or cables of the UAV launcher.

SUMMARY

Unfortunately, there are deficiencies to the above-described conventional approaches to launching a UAV. For example, the conventional hand throw approach requires a human to stand up and throw a UAV horizontally or in a slightly upward direction. Such an approach is not well suited for stealth or covert applications in which it is undesirable to disclose the whereabouts of personnel. Additionally, the initial height and speed imparted on the UAV is limited to by the ability of the human to throw the UAV which may not be in an ideal shape to be hand thrown.

Furthermore, the conventional approach which uses a trailer-sized or desk-sized UAV launcher is not suitable for particular situations such as certain on-foot battlefield applications in which personnel are limited to carrying a certain weight and certain amount of gear. Accordingly, the applications for such UAV launchers are limited to relatively large scale missions with additional transportation means.

Nevertheless, it should be appreciated that there may be particular situations in which it would be advantageous to be able to launch a UAV in a quick-fire manner (i.e., easily and quickly) without the need to setup a trailer-sized or desk-sized UAV launcher. Additionally, it may be preferable to launch the UAV with greater speed, height, and accuracy than that provided by a simple hand throw approach before the UAV is able to control or sustain flight itself. For example, in a hostile trenched area, hand throwing a UAV puts the human thrower at risk and may easily give away the exact location of the human thrower.

In contrast to the above-described conventional UAV launching approaches, improved techniques are directed to launching a UAV using a hand-held weapon. Along these lines, a user can attach a specialized UAV launcher to an end of the hand-held weapon, load the UAV onto the specialized UAV launcher, and fire a blank cartridge from the hand-held weapon to launch the UAV. The firing of the blank cartridge from the hand-held weapon enables a stronger force to be imparted onto the UAV than that available from a hand throw. Furthermore, the user does not need to stand up or reveal his/her location. Rather, the user may remain concealed (e.g., in a shallow trench, behind a small physical structure, etc.) while launching the UAV. Moreover, the specialized UAV launcher and the UAV can be conveniently carried (e.g., in the form of a kit or a package) and thus provide easier portability than a conventional trailer-sized or desk-sized UAV launcher.

One embodiment is directed to a method of launching a UAV. The method includes attaching a UAV launcher to a hand-held weapon, and installing the UAV onto the UAV launcher while the UAV launcher is attached to the hand-held weapon. The method further includes activating the hand-held weapon to launch the UAV into flight from the UAV launcher. Since the user already may be carrying the hand-held weapon for firing ammunition, the user simply needs to further carry the UAV launcher and the UAV which, in some situations, can be packaged into an easy-to-carry container such as a backpack, a carrying case, and so on. Furthermore, this quick-fire method is relatively easy to perform and can be performed in a very short amount of time making the method well suited for certain situations such as in a battlefield or in the case of an emergency when time is of the essence.

Another embodiment is directed to a UAV launching assembly which includes a UAV launcher barrel. The UAV launcher barrel has (i) a weapon attachment section which is constructed and arranged to attach to a hand-held weapon and (ii) a UAV interface section which is constructed and arranged to support a UAV and release the UAV in response to activation of the hand-held weapon while the weapon attachment section of the UAV launcher barrel is attached to the hand-held weapon.

In some arrangements, the hand-held weapon is a firearm including a firearm barrel which defines a firearm bore, and the UAV launcher barrel which defines a launcher bore. In these arrangements, the launcher bore defined by the UAV launcher barrel coaxially aligns with the firearm bore defined by the firearm barrel when the UAV launcher barrel attaches to the firearm barrel.

In some arrangements, the weapon attachment section of the UAV launcher barrel is constructed and arranged to thread onto the firearm barrel. For example, the UAV launcher barrel may have a male threaded form factor to properly attach to a female threaded form factor firearm barrel. Alternatively, the UAV launcher barrel may have a female threaded form factor to properly attach to a male threaded form factor firearm barrel.

In some arrangements, the UAV launcher barrel further includes a baffled section disposed between the weapon attachment section and the UAV interface section. The baffled section defines a set of baffles to suppress noise during firing of the firearm. Such noise suppression may make it more difficult for an enemy to determine the exact UAV launch location.

In some arrangements, the UAV launcher barrel further includes a muzzle break section disposed between the weapon attachment section and the UAV interface section. The muzzle break section defines a set of muzzles to control recoil of the firearm during firing of the firearm.

In some arrangements, the UAV launching assembly further includes a blank charge to be loaded into the firearm. The blank charge is constructed and arranged to propel the UAV into flight from the UAV launcher barrel in response to firing. The blank charge can be configured to impart a predefined speed on the UAV (e.g., approximately 25 miles per hour).

In some arrangements, the UAV launching assembly further includes a projectile member having a first end which fastens to the UAV, and a second end which inserts into the UAV interface section of the UAV launcher barrel, the second end being opposite the first end. The projectile member may be constructed and arranged to detach from the UAV shortly after launch. Additionally, the projectile member may be constructed and arranged to rotate relative to the UAV (e.g., to accommodate any rifling action imposed during launch).

In some arrangements, the UAV launching assembly further includes a UAV base which attaches to the UAV launcher barrel. The UAV base is constructed and arranged to provide a resting surface on which the UAV sits prior to launch and while the projectile member is fastened to the UAV and inserted into the UAV interface section of the UAV launcher barrel. For example, the UAV base may be in the shape or form of a rail which operates to control direction of the UAV and provide stability during launch.

Another embodiment is directed to a UAV launching system which includes a hand-held weapon which is constructed and arranged to fire ammunition, and a UAV launch assembly which is constructed and arranged to launch a UAV. The UAV launch assembly includes a UAV launcher barrel having (i) a weapon attachment section which is constructed and arranged to attach to the hand-held weapon and (ii) a UAV interface section which is constructed and arranged to support the UAV and release the UAV in response to activation of the hand-held weapon while the weapon attachment section of the UAV launcher barrel is attached to the hand-held weapon.

Other embodiments are directed to apparatus, circuitry, components, and so on. Some embodiments are directed to various methods and/or structures which are involved in launching a UAV via a hand-held weapon.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to launching an unmanned aerial vehicle (UAV) using a hand-held weapon. Along these lines, a user can attach a UAV launcher to an end of the hand-held weapon, load the UAV onto the UAV launcher, and fire a blank cartridge from the hand-held weapon to launch the UAV. The firing of the blank cartridge from the hand-held weapon enables a stronger force to be imparted on the UAV than that available from a hand throw. Additionally, the user does not need to stand up or reveal his/her location. Rather, the user may remain concealed while launching the UAV. Furthermore, the specialized UAV launcher and the UAV can be conveniently carried (e.g., in the form of a kit or a package) and thus provide easier portability than a conventional trailer-sized or desk-sized UAV launcher. Moreover, UAV launch is relatively easy to perform and can be performed in a very short amount of time making this a quick-fire technique which is well suited for certain situations such as in a battlefield or in the case of an emergency when time is of the essence.

Figure 1:
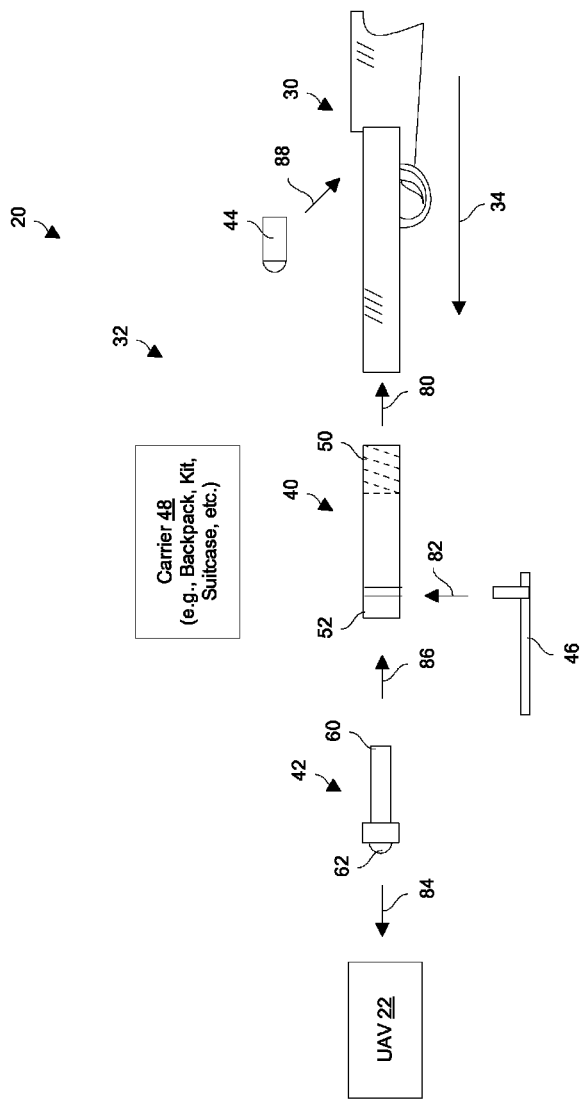
FIG. 1 is a general view of a quick-fire unmanned aerial vehicle (UAV) launching system.

FIG. 1 is a general view of a quick-fire launching system 20 for launching a UAV 22. The launching system 20 includes a hand-held weapon 30 and a UAV launch assembly 32.

The hand-held weapon 30 can take the form of a firearm or gun barreled weapon which is constructed and arranged to fire ammunition (e.g., bullets, rounds, shells, grenades, etc.). The arrow 34 identifies the fire direction and the firearm may include a variety of standard features such as a barrel, a handle or butt, a trigger, a site, and so on. Examples of suitable firearms include rifles (e.g., M4, M16, C7, C8, ARMADA, TRAILBLAIZER carbine, etc.), pistols, grenade launchers (e.g., M203, M320, etc.), shotguns, and other guns and small arms weaponry which are capable of shooting a target at high speed.

The UAV launch assembly 32 includes a UAV launcher barrel 40, a projectile 42, a blank cartridge 44, a UAV base (or bayonet-style attachment) 46, and a carrier 48. In some arrangements, one or more of these components are constructed and arranged to work with standard or legacy equipment such as a standard issue firearm, an off-the-shelf UAV, etc.

The UAV launcher barrel 40 of the UAV launch assembly 32 has a weapon attachment section 50 and a UAV interface section 52. The weapon attachment section 50 is constructed and arranged to attach to the hand-held weapon 30 (e.g., via a set of threads). The UAV interface section 52 is constructed and arranged to support the UAV 22 and release the UAV 22 in response to activation of the hand-held weapon 30 while the weapon attachment section 50 of the UAV launcher barrel 40 is attached to the hand-held weapon 30.

The projectile 42 of the UAV launch assembly 32 includes a weapon facing end 60 and a UAV facing end 62. The weapon facing end 50 of the projectile 42 is constructed and arranged to insert into the UAV interface section 52 of the UAV launcher barrel 40, and receive force from firing the hand-held weapon 30. The UAV facing end 62 is constructed and arranged to fasten or at least contact the UAV 22, and to transfer force due to firing of the hand-held weapon 30 to the UAV 22.

The blank cartridge 44 loads into the hand-held weapon 30 in the same manner as a typical round of ammunition. However, the blank cartridge 44 is constructed and arranged to impart a shockwave onto the projectile member 42 to propel the UAV 22 into flight from the UAV launcher barrel 40 in response to firing. Along these lines, a suitable launch speed for the UAV 22 may be within the range of 10 to 100 miles per hour (mph) (e.g., 25 mph). Accordingly, the blank cartridge 44 may include less charge than the typical round of ammunition.

The UAV base 46 attaches to the UAV launcher barrel 40. The UAV base 46 provides a resting surface on which the UAV 22 can sit prior to launch and while the projectile member 42 is fastened to the UAV 22 and inserted into the UAV launcher barrel 40. By way of example, the UAV base 46 is shown as having a bayonet-style configuration by hanging from the UAV launcher barrel 40 and extending in a parallel direction to the target (arrow 34 in FIG. 1). In some arrangements, the UAV base 46 takes the form of a rail which guides the UAV 22 and provides stability during launch. Other shapes are suitable for use as well such as a platform or tray, a rod for holding a tube or a set of eyelets of the UAV 22, and so on.

The carrier 48 carries and protects the other above-described components of the UAV launch assembly 32. A variety of form factors are suitable for use for the carrier 48 such as a backpack, a briefcase, a suitcase, a kit, a box, etc. Further details will now be provided with reference to FIG. 2.

Figure 2:
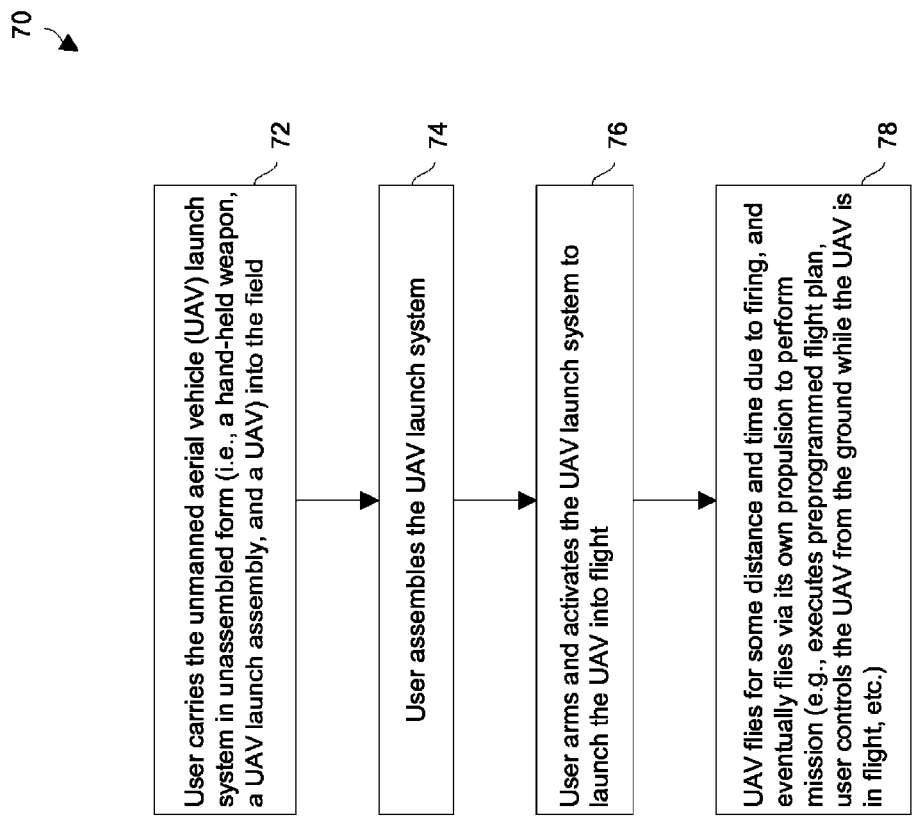
FIG. 2 is a flowchart of a series of activities which occur during launching of a UAV using the UAV launching system of FIG. 1.

FIG. 2 shows a series of activities 70 which occur while a user uses the UAV launch system 20. At 72, the user carries the UAV launch system 20 into the field while the UAV launch system 20 is in unassembled form (also see FIG. 1). Here, the various components of the UAV launch assembly 32 are stowed away and protected within the carrier 48.

In some situations, the user may be on-foot and may be entering a hostile or enemy environment. Accordingly, the user will likely be carrying the hand-held weapon 30 for reasons beyond simply using the hand-held weapon to launch a UAV 22, i.e., for protection, for attack, for law enforcement, riot control, etc. In such a situation, the UAV launch assembly 32 may reside in a light-weight, easy to carry form factor, e.g., the carrier 48 may take the form of a backpack or a hand-held kit. Likewise, the UAV 22 may initially reside in hand-held kit or perhaps even within the carrier 49 of the UAV launch assembly 32 for convenience.

At 74, the user assembles the UAV launch system 20. Here, the user may have encountered trouble or be under attack and thus may have taken cover or shelter. For example, the user may have quickly found refuge behind a small structure or in a shallow trench. Alternatively, the user may have cornered an enemy and wish to quickly inspect the enemy's status or assess how well the enemy is provisioned without getting any closer and before the enemy is able to call for assistance. During assembly of the UAV launch system 20, the user attaches the UAV launcher barrel 40 to the hand-held weapon 30 (also see arrow 80 in FIG. 1). In some arrangements, the weapon attachment section 50 of the UAV launcher barrel 40 includes a set of threads to enable the UAV launcher barrel 40 to richly and robustly connect to a barrel of the hand-held weapon 30.

Next, the user attaches the UAV base 46 to the UAV launcher barrel 40 (also see arrow 82 in FIG. 1). In some arrangements, the UAV base 46 screws or clamps onto the UAV launcher barrel 40. Additionally, in some arrangements, the UAV launch assembly 32 is UAV agnostic in that the UAV launch assembly 32 works with any UAV (e.g., fixed wing, spring-loaded, etc.). Since some UAVs do not require an underlying base or support structure, use of the UAV base 46 is optional.

The user then attaches the UAV facing end 62 of the projectile member 42 to the UAV 22 (arrow 84 in FIG. 1) and then inserts the weapon facing end 60 of the projectile member 42 into the UAV launcher barrel 40 (arrow 86 in FIG. 1). A wide variety of suitable coupling mechanisms are available such as friction fit, fitted ring clamp, loose fitting ball and socket joint, adhesive, and so on. In some arrangements, the projectile member 42 is relatively loose fitting and detaches from the UAV 22 shortly after launch. In other arrangements, the projectile member 42 remains attached to the UAV 22 after launch. In some arrangements, the projectile member 42 is allowed to rotate relative to the UAV 22 during launch in order to absorb any rifling action imparted by the hand-held weapon 30 without substantially transferring that rifling action onto the UAV 22.

At 76, the user arms and activates the UAV launch system 20. In particular, the user loads the blank cartridge 44 into the hand-held weapon 30 (arrow 88 in FIG. 1). Then, the user aims the UAV launch system 20 in a desired direction in which to launch the UAV 22. For example, if the user wishes to maximize distance, the user aims the UAV launch system 20 relatively horizontally near the desired target. However, if the wishes to maximize initial UAV height, the user aims the UAV launch system 20 relatively high at location over the target. The user then pulls the trigger of the hand-held weapon 30 to fire the blank cartridge 44. The discharge through the UAV launcher barrel 40 propels the projectile member 42 and the UAV 22 in the aimed direction thus launching the UAV 22 into flight.

At 78, the UAV 22 flies through the air for some distance and time without need of its own propulsion. Eventually, the UAV 22 loses most of its initial momentum from the firing of the hand-held weapon 30, and requires self propulsion to continue flight. At that point, the UAV 22 can fly based on a preprogrammed flight plan, based on direction from a ground control station (GCS), or based on both. Further details will now be provided with reference to FIG. 3.

Figure 3:
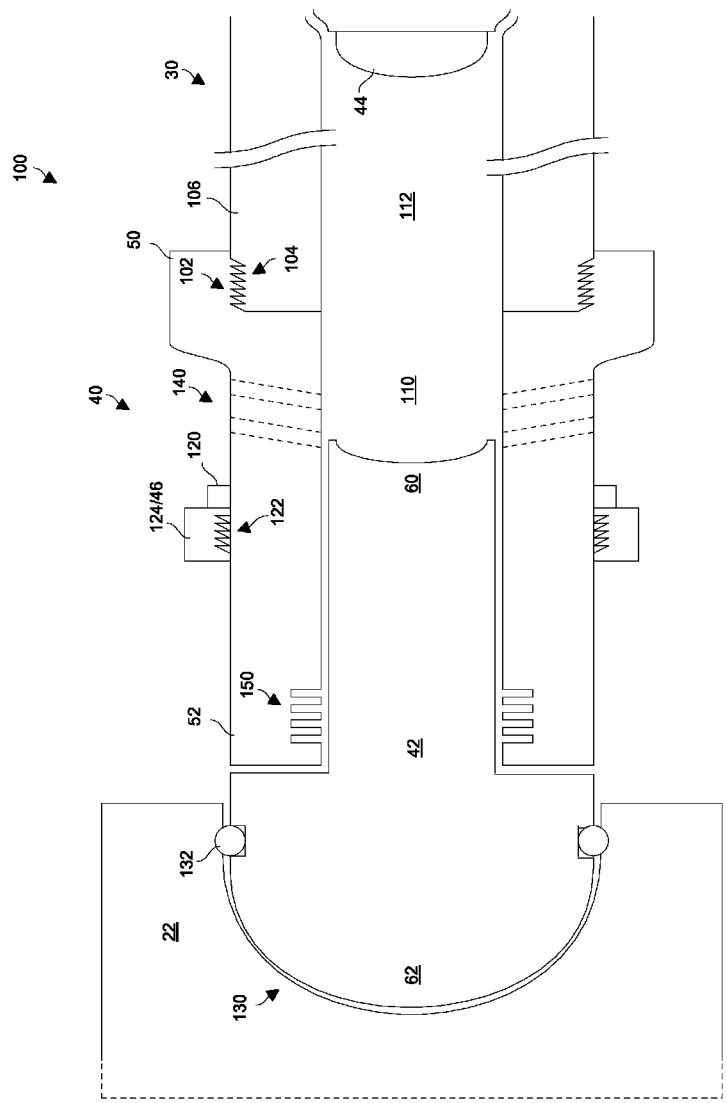
FIG. 3 is a cutaway view of a portion of the UAV launching system of FIG. 1.

FIG. 3 shows a cutaway portion 100 of the UAV launch system 20 in assembled form. It should be understood that the various components of the UAV launch system 20 are not necessarily drawn to scale and/or proportion.

As shown in FIG. 3, the UAV launcher barrel 40 attaches to the hand-held weapon 30. Along these lines, the weapon attachment section 50 of the UAV launcher barrel 40 includes a set of threads 102 to enable the UAV launcher barrel 40 to properly thread onto corresponding threads 104 of a barrel 106 of the hand-held weapon 30. Although the hand-held weapon 30 is shown as having threads 104 on the outside and the UAV launcher barrel 40 is shown as having threads on the inside by way of example, the opposite may exist in other arrangements. When the UAV launcher barrel 40 is properly attached to the barrel 106 of the hand-held weapon 30, the bore 110 of the UAV launcher barrel 40 coaxially aligns with the bore 112 of the hand-held weapon barrel 106.

Additionally, the UAV launcher barrel 40 includes UAV base attachment features such as ring bracing or a stop 120 and threads 122 to receive a bayonet ring 124 of the optional UAV base 46. Such features enable the bayonet ring 124 to insert over the UAV launcher barrel 40 and tightly thread over the threads 122 and against the ring bracing 120 to support at least a portion of the UAV base 46 (e.g., the bayonet ring 124 can lock tightly against the ring bracing 120 and hold an arm or extension member which connects to a rail or a tray that supports and guides the UAV 22. It should be understood that a variety of other attachment mechanisms are suitable for attaching the UAV base 46 such as screws, clamps, and other hardware.

Moreover, the UAV base 46 may also engage the hand-held weapon 30 (e.g., the UAV base 46 can include hardware to attach to the barrel 106 or another portion of the hand-held weapon 30). In these arrangements, the UAV base 46 provides augmented bracing (i.e., serves as an extra bracing point) to prevent damage to the various components of the UAV launching system 20 when the user fires the hand-held weapon 30.

Furthermore, the projectile member 42 is attached to the UAV 22 and is installed within the UAV launcher barrel 40. In particular, the UAV facing end 62 engages a cavity 130 of the UAV 22 and is shaped to enable the projectile member 42 to rotate relative to the UAV 22 if necessary due to rifling from the hand-held weapon 30. In some arrangements, a retaining ring 132 sits in a retaining ring groove and fastens the projectile member 42 to the UAV 22. The retaining ring 132 is designed to shatter during launch (e.g., in response to compaction between the projectile member 42 and the UAV 22). When the retaining ring 132 shatters, the projectile member 42 separates from the UAV 22. It should be understood that other geometries and fastening mechanisms are suitable for attaching the projectile member 42 to the UAV 22 such as a gasket, adhesive, and so on. Moreover, in some arrangements, the portion of the UAV 22 forming the cavity 130 can be padded to provide cushioning during firing and thus minimize the risk of damaging the UAV 22.

As further shown in FIG. 3, the blank cartridge 44 is loaded into the hand-held weapon 30. Since the barrel bores 110, 112 are aligned to form a straight cavity, force from firing the hand-held weapon 30 propels the projectile member 42 and the UAV 22 at an effective launch speed. The amount of energy from firing the blank cartridge 44 is predefined to impart enough force on the projectile member 42 and the UAV 22 so that the launch speed falls within a range of 10 to 100 mph (e.g., 20 mph, 25 mph, 40 mph, 50 mph, etc.).

It should be understood that, in some arrangements, the UAV launcher barrel 40 includes additional features to improve the UAV launching process. In particular, the UAV launcher barrel 40 includes (or defines) a muzzle brake 140 which is disposed part way down the length of the UAV launcher barrel 40 between the weapon attachment section 50 and the UAV interface section 52. In some arrangements, the muzzle brake 140 is a set of slots that enable gasses to vent during firing. Such venting softens and/or controls recoil of the UAV launch system 20 during UAV launch (e.g., provides stability and prevents inadvertent misdirection of the UAV launching system 20).

Additionally, the UAV launcher barrel 40 includes (or defines) a suppressive baffle 150 which is disposed within the UAV interface section 52 of the UAV launcher barrel 40. In some arrangements, the suppressive baffle 150 includes a set of baffles or flanges that suppresses noise during firing. Accordingly, the UAV 22 can be launch stealthily, covertly or perhaps indistinctively during rounds of gunfire which masks the launching of the UAV 22.

Other features are suitable for use as well such as additional hardware to attach the UAV launcher barrel 40 to the hand-held weapon 30. For example, an elongated bracket can be included to provide extra bracing to control recoil and chucking. Along these lines, the elongated bracket can include a key or slot to fit with a bayonet slot of the hand-held weapon 30. Such an elongated bracket can mount over the barrels 110, 112 in a manner similar to the way a modern M7 bayonet mounts on an M4 firearm. Moreover, such a bracket may form a portion of the UAV base 46 which facilitates holding and guiding the UAV 22. Further details will now be provided with reference to FIG. 4.

Figure 4:
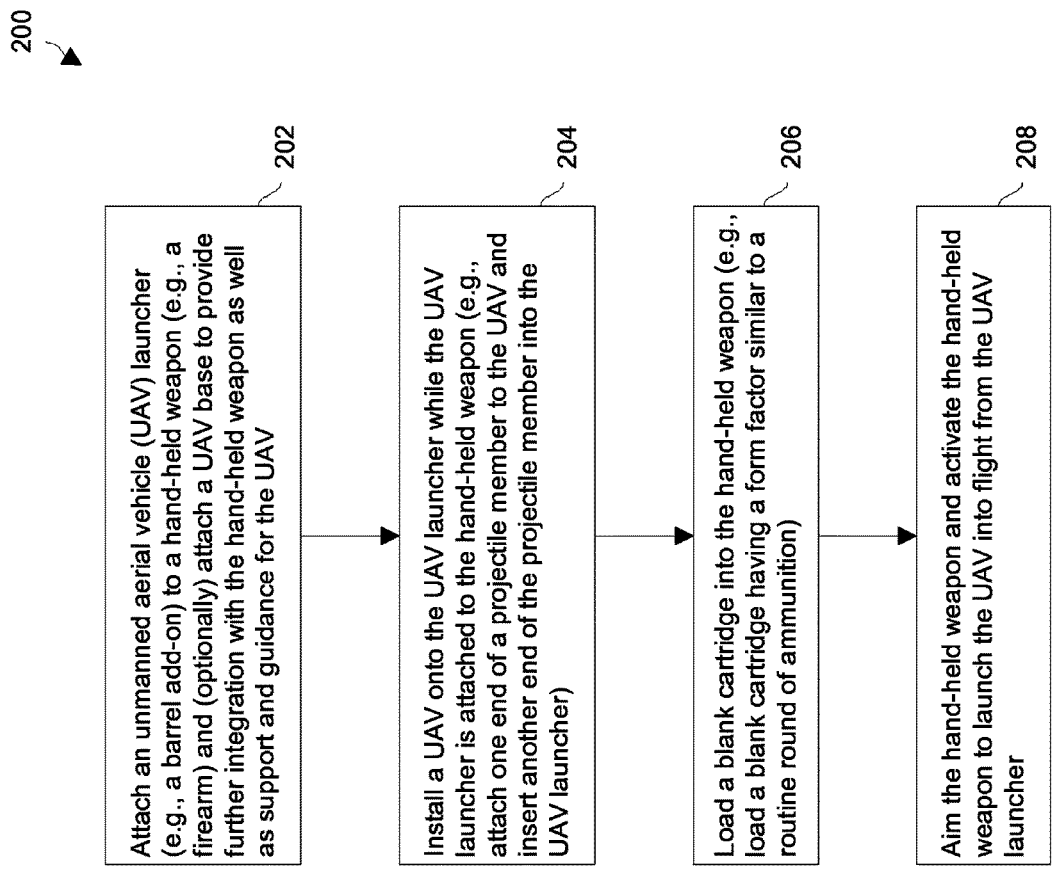
FIG. 4 is a flowchart of a procedure for using the UAV launching system of FIG. 1.

FIG. 4 is a flowchart of a simply quick-fire procedure 200 which is performed by a user to launch a UAV. The procedure 200 provides certain details for the activities 74 and 76 in FIG. 2.

At 202, the user attaches a UAV launcher to a hand-held weapon such as a firearm. In particular, the user can fasten a specialized extension or "barrel add-on" to the barrel of the hand-held weapon (e.g., see the UAV launcher barrel 40 in FIGS. 1 and 3). As part of 202, the user can attach additional hardware such as a bayonet mount assembly which provides further bracing as well as provides support and guidance to the UAV during launch (e.g., see the UAV base 46 in FIG. 1).

At 204, the user installs a UAV onto the UAV launcher while the UAV launcher is attached to the hand-held weapon. Here, the user attaches one end of a projectile member to the UAV and inserts another end of the projectile member into the barrel add-on (e.g., see the projectile member 42 in FIGS. 1 and 3).

At 206, the user loads a blank cartridge into the hand-held weapon. Since the hand-held weapon also serves as a firearm, the blank cartridge can have a form factor similar to a round of ammunition.

At 208, the user aims the hand-held weapon and activates the hand-held weapon to launch the UAV into flight from the UAV launcher. As the blank cartridge is fired, the UAV and the projectile member are propelled forward providing initial flight to the UAV. At some point shortly after launching, the projectile member may separate from the UAV thus enabling the UAV to continue flying on its own and without the projectile member.

As described above, improved techniques are directed to launching a UAV 22 using a hand-held weapon 30. Along these lines, a user can attach a UAV launcher barrel 40 to an end of the hand-held weapon 30, load the UAV 22 onto the UAV launcher barrel 40, and fire a blank cartridge 44 from the hand-held weapon 30 to launch the UAV 22. The firing of the blank cartridge 44 from the hand-held weapon 30 enables a stronger force to be imparted onto the UAV 22 than that available from a hand throw. Furthermore, the user does not need to stand up or reveal his/her location. Rather, the user may remain concealed (e.g., in a shallow trench, behind a small physical structure, etc.) while launching the UAV 22. Moreover, the UAV launcher barrel 40 and the UAV 22 can be conveniently carried via a carrier 48 thus providing easier portability than a conventional trailer-sized or desk-sized UAV launcher.

While various embodiments of the present disclosure have been particularly shown and described, it will be understood by those skilled in the art that various changes in form and details may be made therein without departing from the spirit and scope of the present disclosure as defined by the appended claims.

For example, the hand-held weapon 30 was described above as being a firearm which fires a blank cartridge to launch a UAV 22. In other arrangements, the hand-held weapon 30 is an apparatus other than a firearm such as a bow, a cross-bow, a pistol bow, a dart gun, and the like. Furthermore, the hand-held weapon 30 may be air powered, gas powered, pneumatic or hydraulic powered, and so on.

Additionally, it should be understood that above-described UAV launch assembly 32 is UAV agnostic. That is, the term UAV refers to a variety of vehicles including unmanned aircraft (UA) generally, organic air vehicles (OAVs), micro air vehicles (MAVs), unmanned combat air vehicles (UCAVs), and so on. Moreover, such UAVs may be utilized for a variety of missions including surveillance, payload delivery, communications, and so on. Such modifications and enhancements are intended to belong to various embodiments of the disclosure.

What is claimed is:

1. A method of launching an unmanned aerial vehicle (UAV), the method comprising:
    attaching a UAV launcher to a hand-held weapon;
    installing a UAV onto the UAV launcher while the UAV launcher is attached to the hand-held weapon; and
    activating the hand-held weapon to launch the UAV into flight from the UAV launcher;
    wherein the hand-held weapon is a firearm including a firearm barrel which defines a firearm bore;
    wherein the UAV launcher includes a UAV launcher barrel which defines a launcher bore;

wherein attaching the UAV launcher to the hand-held weapon includes:
connecting the UAV launcher barrel to the firearm barrel, the firearm bore defined by the firearm barrel being aligned with the launcher bore when the UAV launcher barrel is connected to the firearm barrel;
wherein connecting the UAV launcher barrel to the firearm barrel includes threading the UAV launcher barrel onto the firearm barrel;
wherein the method further comprises:
prior to activating the hand-held weapon, loading the firearm with a blank charge which is constructed and arranged to propel the UAV into flight from the UAV launcher in response to firing; and
wherein installing the UAV onto the UAV launcher includes:
fastening a first end of a projectile member to the UAV; and
inserting a second end of the projectile member into the UAV launcher barrel, the second end of the projectile member being opposite the first end of the projective member;
wherein the first end of the projectile member (i) has a first diameter which is larger than the UAV launcher barrel and (ii) fits into a cavity of the UAV; and
wherein the second end of the projectile member (i) has a second diameter which is narrower than the first diameter and (ii) fits within the launcher bore defined by the UAV launcher barrel.

2. A method as in claim 1 wherein fastening the first end of the projectile member to the UAV includes:
coupling the first end of the projectile member to the UAV such that the projectile member disconnects from the UAV after launching.

3. A method as in claim 1 wherein fastening the first end of the projectile member to the UAV includes:
coupling the first end of the projectile member to the UAV such that the projectile member rotates relative to the UAV after launching.

4. A method as in claim 1 wherein fastening the first end of the projectile member to the UAV includes:
engaging the first end of the projectile member within a cavity of the UAV to attach the projectile member to the UAV; and
wherein inserting the second end of the projectile member into the UAV launcher barrel includes:
after the projectile member is attached to the UAV, inserting the second end of the projectile member into the UAV launcher barrel through an open end of the UAV launcher barrel.

5. An unmanned aerial vehicle (UAV) launching assembly, comprising:
a UAV launcher barrel having (i) a weapon attachment section which is constructed and arranged to attach to a hand-held weapon and (ii) a UAV interface section which is constructed and arranged to support a UAV and release the UAV in response to activation of the hand-held weapon while the weapon attachment section of the UAV launcher barrel is attached to the hand-held weapon, and
a projectile member having a first end which fastens to the UAV, and a second end which inserts into the UAV interface section of the UAV launcher barrel, the second end being opposite the first end;
wherein the hand-held weapon is a firearm including a firearm barrel which defines a firearm bore;
wherein the UAV launcher barrel defines a launcher bore;
wherein the launcher bore defined by the UAV launcher barrel coaxially aligns with the firearm bore defined by the firearm barrel when the UAV launcher barrel attaches to the firearm barrel;
wherein the weapon attachment section of the UAV launcher barrel is constructed and arranged to thread onto the firearm barrel;
wherein the first end of the projectile member (i) has a first diameter which is larger than the UAV launcher barrel and (ii) fits into a cavity of the UAV; and
wherein the second end of the projectile member (i) has a second diameter which is narrower than the first diameter and (ii) fits within the launcher bore defined by the UAV launcher barrel.

6. A UAV launching assembly as in claim 5 wherein the UAV launcher barrel further includes a baffled section disposed between the weapon attachment section and the UAV interface section, the baffled section defining a set of baffles to suppress noise during firing of the firearm.

7. A UAV launching assembly as in claim 5 wherein the UAV launcher barrel further includes a muzzle break section disposed between the weapon attachment section and the UAV interface section, the muzzle break section controlling recoil of the firearm during firing of the firearm.

8. A UAV launching assembly as in claim 5, further comprising:
a blank charge to be loaded into the firearm, the blank charge being constructed and arranged to propel the UAV into flight from the UAV launcher barrel in response to firing.

9. A UAV launching assembly as in claim 5, further comprising:
a UAV base which attaches to the UAV launcher barrel, the UAV base being constructed and arranged to provide a resting surface on which the UAV sits prior to launch.

10. A UAV launching assembly as in claim 9 wherein the UAV base is in the form of a rail which is constructed and arranged to guide the UAV during launch.

11. A UAV launching assembly as in claim 5, further comprising:
a blank charge to be loaded into the firearm, the blank charge being constructed and arranged to propel the UAV into flight from the UAV launcher barrel in response to firing; and
a UAV base which attaches to the UAV launcher barrel, the UAV base being constructed and arranged to provide a resting surface on which the UAV sits prior to launch and while the projectile member is fastened to the UAV and inserted into the UAV interface section of the UAV launcher barrel.

12. A UAV launching assembly as in claim 5 wherein the projectile member is constructed and arranged to rotate relative to the UAV while the first end of the projectile member fits into the cavity of the UAV.

13. A UAV launching assembly as in claim 5 wherein the projectile member is constructed and arranged to rotate relative to the UAV launcher barrel during launch while absorbing rifling action imparted by the hand-held weapon.

14. A UAV launching assembly as in claim 5 wherein the projectile member is constructed and arranged to rotate relative to (i) the UAV launcher barrel and (ii) the UAV in response to rifling action imparted on the projectile member by firing of the hand-held weapon.

15. A UAV launching assembly as in claim 5, further comprising:

a retainer which is disposed between the projectile member and the UAV prior to launching the UAV, the retainer being constructed and arranged to fasten the projectile member to the UAV prior to launching the UAV.

16. A UAV launching assembly as in claim 15 wherein the retainer is disposed within a groove defined by the UAV prior to launching the UAV.

17. An unmanned aerial vehicle (UAV) launching system, comprising:
- a hand-held weapon which is constructed and arranged to fire ammunition; and
- a UAV launch assembly which is constructed and arranged to launch a UAV, the UAV launch assembly including a UAV launcher barrel having (i) a weapon attachment section which is constructed and arranged to attach to the hand-held weapon, (ii) a UAV interface section which is constructed and arranged to support the UAV and release the UAV in response to activation of the hand-held weapon while the weapon attachment section of the UAV launcher barrel is attached to the hand-held weapon, and (iii) a projectile member having a first end which fastens to the UAV, and a second end which inserts into the UAV interface section of the UAV launcher barrel, the second end being opposite the first end;
- wherein the first end of the projectile member (i) has a first diameter which is larger than the UAV launcher barrel and (ii) fits into a cavity of the UAV; and
- wherein the second end of the projectile member (i) has a second diameter which is narrower than the first diameter and (ii) fits within a launcher bore defined by the UAV launcher barrel.

18. A UAV launching assembly as in claim 17 wherein the hand-held weapon is a firearm; and wherein the UAV launching assembly further includes:
- a blank charge to be loaded into the firearm in place of the ammunition, the blank charge being constructed and arranged to propel the UAV into flight from the UAV launcher barrel in response to firing while the weapon attachment section of the UAV launcher barrel is attached to the hand-held weapon; and
- a UAV base which attaches to the UAV launcher barrel, the UAV base being constructed and arranged to provide a resting surface on which the UAV sits prior to launch and while the projectile member is fastened to the UAV and inserted into the UAV interface section of the UAV launcher barrel.

19. A UAV launching system as in claim 18, further comprising:
- a UAV to be launched into flight from the UAV launcher barrel of the UAV launch assembly, the UAV being constructed and arranged to fasten to the projectile member.

20. A UAV launching system as in claim 17, further comprising:
- a retainer which is disposed between the projectile member and the UAV prior to launching the UAV, the retainer being constructed and arranged to fasten the projectile member to the UAV prior to launching the UAV, wherein the retainer is disposed within a groove defined by the UAV prior to launching the UAV.

21. An unmanned aerial vehicle (UAV) launching assembly, comprising:
- a UAV launcher barrel having (i) a weapon attachment section which is constructed and arranged to attach to a hand-held weapon and (ii) a UAV interface section which is constructed and arranged to support a UAV and release the UAV in response to activation of the hand-held weapon while the weapon attachment section of the UAV launcher barrel is attached to the hand-held weapon,
- a projectile member having a first end which fastens to the UAV, and a second end which inserts into the UAV interface section of the UAV launcher barrel, the second end being opposite the first end, and
- a retainer which is disposed between the projectile member and the UAV prior to launching the UAV, the retainer being constructed and arranged to fasten the projectile member to the UAV prior to launching the UAV, wherein the retainer is disposed within a groove defined by the UAV prior to launching the UAV;
- wherein the hand-held weapon is a firearm including a firearm barrel which defines a firearm bore;
- wherein the UAV launcher barrel defines a launcher bore;
- wherein the launcher bore defined by the UAV launcher barrel coaxially aligns with the firearm bore defined by the firearm barrel when the UAV launcher barrel attaches to the firearm barrel; and
- wherein the weapon attachment section of the UAV launcher barrel is constructed and arranged to thread onto the firearm barrel.

* * * * *